United States Patent
Van Kerrebroeck

(10) Patent No.: US 9,937,534 B2
(45) Date of Patent: Apr. 10, 2018

(54) POULTRY FEED DISTRIBUTION SYSTEM WITH FEEDING DEVICES HAVING ROTATABLE ATTACHMENT PARTS WITH DROP TUBES HINGEDLY CONNECTED THERETO

(71) Applicant: ROXELL bvba, Maldegem (BE)

(72) Inventor: Brecht Van Kerrebroeck, Wanzele (BE)

(73) Assignee: Roxell BVBA, Maldegem (BE)

( * ) Notice: Subject to any disclaimer, the term of this patent is extended or adjusted under 35 U.S.C. 154(b) by 154 days.

(21) Appl. No.: 14/888,953

(22) PCT Filed: May 7, 2014

(86) PCT No.: PCT/EP2014/059298
§ 371 (c)(1),
(2) Date: Nov. 4, 2015

(87) PCT Pub. No.: WO2014/180881
PCT Pub. Date: Nov. 13, 2014

(65) Prior Publication Data
US 2016/0073615 A1 Mar. 17, 2016

(30) Foreign Application Priority Data
May 7, 2013 (NL) ..................................... 2010765

(51) Int. Cl.
*B08B 3/02* (2006.01)
*A01K 39/012* (2006.01)
(52) U.S. Cl.
CPC ............ *B08B 3/02* (2013.01); *A01K 39/0125* (2013.01)

(58) Field of Classification Search
CPC .... B08B 3/00; B08B 3/02; B08B 3/04; A01K 3/012; A01K 3/0125
See application file for complete search history.

(56) References Cited

U.S. PATENT DOCUMENTS

| 5,875,733 A | 3/1999 | Chen |
| 5,927,232 A * | 7/1999 | Pollock ............. A01K 39/0125 119/53 |
| 6,532,895 B1 | 3/2003 | Andersen |

FOREIGN PATENT DOCUMENTS

| CN | 1034654 A | 8/1989 |
| CN | 1092932 A | 10/1994 |
| CN | 1474648 A | 2/2004 |

(Continued)

OTHER PUBLICATIONS

Notice of the First Office Action for a counterpart foreign application, i.e., Chinese Application No. 201480026001.1, dated Dec. 23, 2016.

*Primary Examiner* — Saeed T Chaudhry
(74) *Attorney, Agent, or Firm* — Hoffmann & Baron, LLP

(57) ABSTRACT

A poultry feed distribution system includes a feed storage, a conveyor line and feeding devices. Each feeding device has an attachment part that is rotatable around the line. The attachment part has a drop tube of the device hingedly connected thereto. The attachment part together with the hinge connection to the drop tube is rotatable around the line between a feeding and a cleaning position, with an inlet of the drop tube getting distanced from the line when the attachment part together with the hinge connection to the drop tube is rotated from the feeding to the cleaning position.

18 Claims, 13 Drawing Sheets

(56) References Cited

FOREIGN PATENT DOCUMENTS

| | | | |
|---|---|---|---|
| CN | 1541060 | A | 10/2004 |
| CN | 201585327 | U | 9/2010 |
| CN | 103039378 | A | 4/2013 |
| EP | 0421553 | A1 | 10/1991 |
| WO | 00/49857 | A1 | 8/2000 |
| WO | 03/055299 | A1 | 7/2003 |

* cited by examiner

POULTRY FEED DISTRIBUTION SYSTEM WITH FEEDING DEVICES HAVING ROTATABLE ATTACHMENT PARTS WITH DROP TUBES HINGEDLY CONNECTED THERETO

CROSS-REFERENCE TO RELATED APPLICATIONS

This application is the National Stage of International Application No. PCT/EP2014/059298 filed May 7, 2014, which claims the benefit of Netherlands Application No. NL 2010765, filed May 7, 2013, the contents of which is incorporated by reference herein.

FIELD OF THE INVENTION

The invention relates to a feed distribution system for feeding poultry, such as chickens, turkeys, etc., in a poultry house.

BACKGROUND OF THE INVENTION

From the state of the art a large number of feed distribution systems are known. These systems have in common the fact that fixed feed dispensing points are present in the poultry house, and that the feed to be dispensed has to be conveyed from a central storage place to said feed dispensing points. For the conveyance of the feed a pipe conveyor system is present, which comprises one or more substantially horizontally directed feed conveyor pipes, which are disposed substantially parallel to each other, and which feed conveyor pipes are provided with means for conveying feed through them. The feed dispensing points are situated along the abovementioned feed conveyor pipes, and have regular distances between them.

A feeding device is disposed at each feed dispensing point. Such feeding devices are known in a wide variety of different embodiments. Most of them comprise a dish-shaped dispensing pan, a feed drop tube opening out above a central part of the pan in such a way that a volume of feed transported to the drop tube is distributed substantially evenly over the bottom surface of the pan. The pan can be directly connected to the drop tube by means of a suitable connection or indirect by means of several spoke-like plastic bars or carrying arms which are equally divided around the circumference of the device. In the last case the connection between the bars and the drop tube preferably is not rigid but is such that the height of the drop tube with respect to the pan can be altered in order to influence the amount of feed which enters the pan. Openings are present between the bars for the poultry to have access to feed distributed in the pan. Each opening is at least large enough for one animal to put his head through, but also may be large enough for accommodating the heads of several animals standing next to each other. See for example EP-0 421 553 or U.S. Pat. No. 5,875,733.

The conveyor pipes mostly have downwardly directed rectangular outlet openings at the positions of the feed dispensing points. The feeding devices in their entirety may be attached in such a way to the conveyor pipe that they are able to rotate somewhat around a longitudinal axis thereof. This rotatability helps to prevent injuries to the animals and damaging to the feeding devices themselves when bumping against the feeding devices. For obtaining this rotatability a cylindrical recess is formed into an assembly of a top end of the drop tube and a top support organ mounted thereto. In this attached position, the top end of the drop tube forms an inlet which is positioned directly underneath the outlet opening in the conveyor pipe.

This known type of feed distribution system has the disadvantage that it is somewhat difficult to clean.

When it is for example desired to clean the feeding devices of EP-0 421 553 with a high pressure hose, then it is very difficult and time consuming to remove all the dispensing pans from the devices in order to be able to properly clean them. Also it is very difficult and time consuming to place the pans back again after they have been cleaned. This is caused by the fact that a snapping connection between a lower ring of a grill assembly and the entire outer circumferential edge of the pan needs to be released and fastened again. After the pan has been removed it remains difficult if not say impossible to properly clean the inside of the drop tube. This can only be hosed clean by forcedly spraying water into a bottom end of the drop tube. However, for this the farmer needs to bend all the way down and he is likely to get all wet and dirty himself because of droplets splashing back. Also with this, a large part of the dirt is likely to be blown further upwards into the drop tube and the top support organ. Even worse it may happen that, because the outlet opening in the conveyor pipe is still open, the water and dirt are partly blown into the conveyor pipe. All in all this forms a risk that infection locations are formed where all kinds of bacteria and mould may start to grow. This may threaten the health of the animals. Blockades may be formed inside the conveyor pipe which may make it difficult or even impossible for enough feed to enter the pan at that specific feed dispensing point. Because of this some farmers even remove the entire feeding devices from the conveyor pipes, for which they need to disconnect the top support organs from the drop tubes. This is also a difficult and time-consuming operation.

With the feeding devices of U.S. Pat. No. 5,875,733 the removal of the dispensing pans is more easy since their dispensing pan is hingedly connected by means of a hinge joint to a lower ring of a grill assembly. Besides this hinge joint, the pan and the grill assembly are locked in position to each other by means of two clamping members. After the clamping members are released, the hinge joint makes it possible to quickly open the device by letting the pan rotate from its horizontal position to a downwardly hanging vertical position.

However, even then it is still difficult to clean the feeding devices. Firstly, when hinged open, the dispensing pan is freely hanging downwards and is unable to withstand the pressure from the cleaning jet of water. Thus the pan is somewhat difficult to clean and some farmers still take of the entire pan in order to be able to immerse it in a tank of disinfection fluid. Also it is emphasized that the inside of the drop tube can then still only be hosed clean by the farmer bending all the way down and then spraying water from underneath into the drop tube. Because of this infection hazards or blockades are still likely to occur inside the drop tubes and conveyor pipes.

With an alternative type of feed distribution system as shown in U.S. Pat. No. 6,532,895, which corresponds to WO 00/49857, it is known to mount the conveyor pipe rotatable around its longitudinal axis. During a first angular rotation of 90 degrees of the pipe the feeding pans maintain to hang freely downwards while the outlet openings in the pipe are rotated towards closed positions. During a subsequent second angular rotation of 90 degrees of the pipe the feeding pans are forced to co-rotate with the pipe and be moved from their downwardly hanging positions towards sideways projecting positions. In this sideways projecting positions the pans and the outer sides of the drop tubes can more easily be hosed clean. Because all the outlets in the conveyor pipe are simultaneously closed, it can also be ensured that the insides of the conveyor pipes remain dry.

However, it remains a problem to hose clean the insides of the drop tubes. For this it still would be necessary to first remove the dispensing pans and even then the farmer would be likely to forcedly blow at least some of the dirt merely further into the drop tubes towards their attachments with the conveyor pipes and into the top support organ. Furthermore this type of attachment places high demands on the partly rotation fixed connections between the feeding devices and the conveyor pipes. Also it requires a relative high force to centrally rotate the conveyor pipe with all the feeding devices hanging thereto by means of the farmer operating specific operating levers connected to the pipes.

SUMMARY OF THE INVENTION

The present invention aims to overcome the abovementioned disadvantages at least partly, or to provide a usable alternative. In particular the invention aims to make a true difference in the cleaning efficiency of poultry feed distribution systems, while at the same time making the system even more user friendly without making it vulnerable, heavy or expensive.

This aim is achieved by a feed distribution system according to the present invention. The system comprises a feed storage, at least one conveyor line, for example a conveyor pipe, with a number of mutually spaced outlets and a number of feeding devices each having a dish-shaped dispensing pan and a feed drop tube opening out above a central part of the pan. Transportation means are provided for transporting feed out of the storage via the conveyor line towards the respective feeding devices. Each feeding device is attached to the conveyor line with an inlet of its drop tube positioned below one of the outlets, and each feeding device has an attachment part that is rotatable around a longitudinal axis of the conveyor line. According to the inventive thought each attachment part which is rotatable around the longitudinal axis of the conveyor line is made as a separate distinctive component from the drop tube, while at the same time the drop tube is hingedly connected by means of a hinge connection to this attachment part. The assembly of the attachment part together with the drop tube hingedly connected thereto, is rotatable around the longitudinal axis of the conveyor line between a feeding and a cleaning position. During a rotation from the feeding towards the cleaning position, the inlet of the drop tube automatically gets distanced from the outlet of the conveyor line, and in particular gets to have its inlet freely accessible from above, while at the same time the attachment part also gets accessible for cleaning. When the assembly subsequently is rotated back towards the feeding position again, the inlet of the drop tube automatically gets to lie near the outlet of the conveyor line, and in particular may get to lie substantially sealingly connecting thereto.

Thus the feeding devices can be thoroughly cleaned in their entirety. A farmer can now even hose clean the inside of the drop tube without running the risk of dirt being blown towards and leaving behind at blind spots inside it. The attachment part itself forms a large hinge which can be made strong and robust. The operating force for rotating this large hinge around the conveyor line while at the same time moving the drop tube towards its feeding or cleaning position is relative low and can be done for one feeding device at a time. The dispensing pan now no longer has to be disconnected or hinged open in order to be able to thoroughly clean it. Any water remaining behind in the pan can easily be removed therefrom by swinging the pan together with the drop tube further behind around the hinge connection relative to the attachment part.

In a preferred embodiment the attachment part comprises a passage which is rotatable in front of the outlet of the conveyor line in the feeding position. Furthermore, in this preferred embodiment, the attachment part comprises a valve element which is rotatable in front of the outlet of the conveyor line in the cleaning position. Thus a rotation of the attachment part not only results in the drop tube moving towards its other position but at the same time automatically results in the outlet opening getting opened or closed. Thus, in the cleaning position, water and dirt can no longer be blown into or otherwise enter the conveyor line at that location. An additional advantage is that it has now even become possible to hose clean the inside of the conveyor lines. By closing all its outlets, it becomes truly possible to have water flow through the entire line and flush it clean efficiently. A sticking or caking of moist feed particles anywhere inside the line can thus be prevented.

Advantageously the hinge connection in the feeding position takes in an upper position relative to the conveyor line, and in the cleaning position takes in a lower position relative to the conveyor line. A rotation of the attachment part thus automatically results in the hinge connection with the drop tube moving towards a lower position. The angular rotation for example may be 90 degrees. A maximum lowering of the hinge connection and therewith a maximum downwards movement of the inlet of the drop tube relative to the conveyor line, however can be obtained when the hinge connection in the feeding position is placed straight above the line and in the cleaning position is placed straight below the line. In that case an angular rotation of 180 degrees needs to be made to rotate the attachment part from the feeding into the cleaning position and vice versa.

In a variant releasable locking means are provided between the drop tube and the attachment part for releasably locking them together in the feeding position. Thus it can be guaranteed that the feeding device can not all of a sudden move towards the cleaning position, for example because of the animals bumping against it. The releasable locking means for example can be formed by a snap connection.

In particular the hinge connection with the drop tube is interspaced from the actual inlet opening of the drop tube which needs to be brought in flow communication with the outlet opening of the conveyor line in the feeding position. For example the drop tube at its upper side is provided with a recessed segment delimiting a cut-out. The hinge connection can then be provided at an upper part of the recessed segment, whereas the inlet of the drop tube can then be provided at a lower part of the recessed segment. The recessed segment is well able to grip around the conveyor line and attachment part in the feeding position, to bring the inlet of the drop tube into flow communication with the outlet of the conveyor line in the feeding position, and to move the inlet of the drop tube away from this outlet in the cleaning position.

The attachment part can be made out of one piece and be slid around the conveyor line starting at its free end. Advantageously however the attachment part comprises two halves each delimiting substantially a semi-circular cross-sectional segment of the conveyor line. By equipping each halve with suitable connection means the attachment part can be assembled and mounted around the conveyor line directly at its aimed feed dispensing point. In the alternative it is also possible to have the two halves hingedly connect to each other, in particular by means of an integrally formed film hinge.

In order to suitably guide the rotational movements of the attachment part around the longitudinal axis of the conveyor line and preventing it from sliding sideways over the line, the conveyor line can be provided with two interspaced outwardly projecting guiding parts between and along which circumferential wall parts of the attachment part can be guided. Those guiding parts for example can be formed by outwardly bend lips positioned directly adjacent opposing sides of the outlet in the longitudinal direction of the conveyor line.

In a further preferred embodiment a wire is provided above the conveyor line with the attachment part being hooked to the wire. The wire, which can be charged with electric power, helps to prevent animals from climbing on top of the conveyor line. Furthermore the wire may be spring tensioned in order to help to bias the feeding devices somewhat in their downwardly hanging feeding position. Advantageously, the attachment part, when being connected to the tensioned wire, maintains being rotatable around the longitudinal axis of the conveyor line. This helps to prevent the animals from getting bruised/injured and/or the feeding device from getting damaged. As soon as it is desired to start rotating the attachment part from its feeding into its cleaning position, the wire, however needs to be released in order to give the attachment part the full freedom to be rotated and no longer be biased back into its feeding position.

Preferably the wire may substantially extend through the hinge connection between the drop tube and the attachment part. In combination with the above described variant of the hinge connection in the feeding position being placed straight above the line and in the cleaning position getting positioned straight below the line, this may result in a compact and strong attachment part making a maximum interspacing possible for the inlet of the drop tube when moved into its cleaning position.

In a variant the wire is not hooked to the attachment part but instead is hooked to a distinctive top-piece which is separately connected to the conveyor line. For example the top piece can extend as a bridging organ over the attachment part such that the attachment part is rotatable underneath the top piece. Releasable locking means can be provided between the top piece and the attachment part. In a locked position the top piece is then able to co-rotate together with the feeding device around the conveyor line. In an unlocked position the top piece is then able to maintain its position, while the feeding device rotates around the conveyor line. Owing to this it is advantageously possible in this unlocked position to rotate the attachment part without it first being necessary to release the wire. The wire then can be kept in place during rotations of the attachment part from its feeding towards its cleaning position. Furthermore it is noted that in this variant, if a wire is not foreseen to be used at all, that then the top-piece can easily be left out.

The invention also relates to a feeding device and to a method for performing a cleaning operation.

BRIEF DESCRIPTION OF THE DRAWINGS

The invention shall be clarified in more detail below with reference to some embodiments as shown in the drawings, in which.

DETAILED DESCRIPTION OF THE INVENTION

Figure 1:
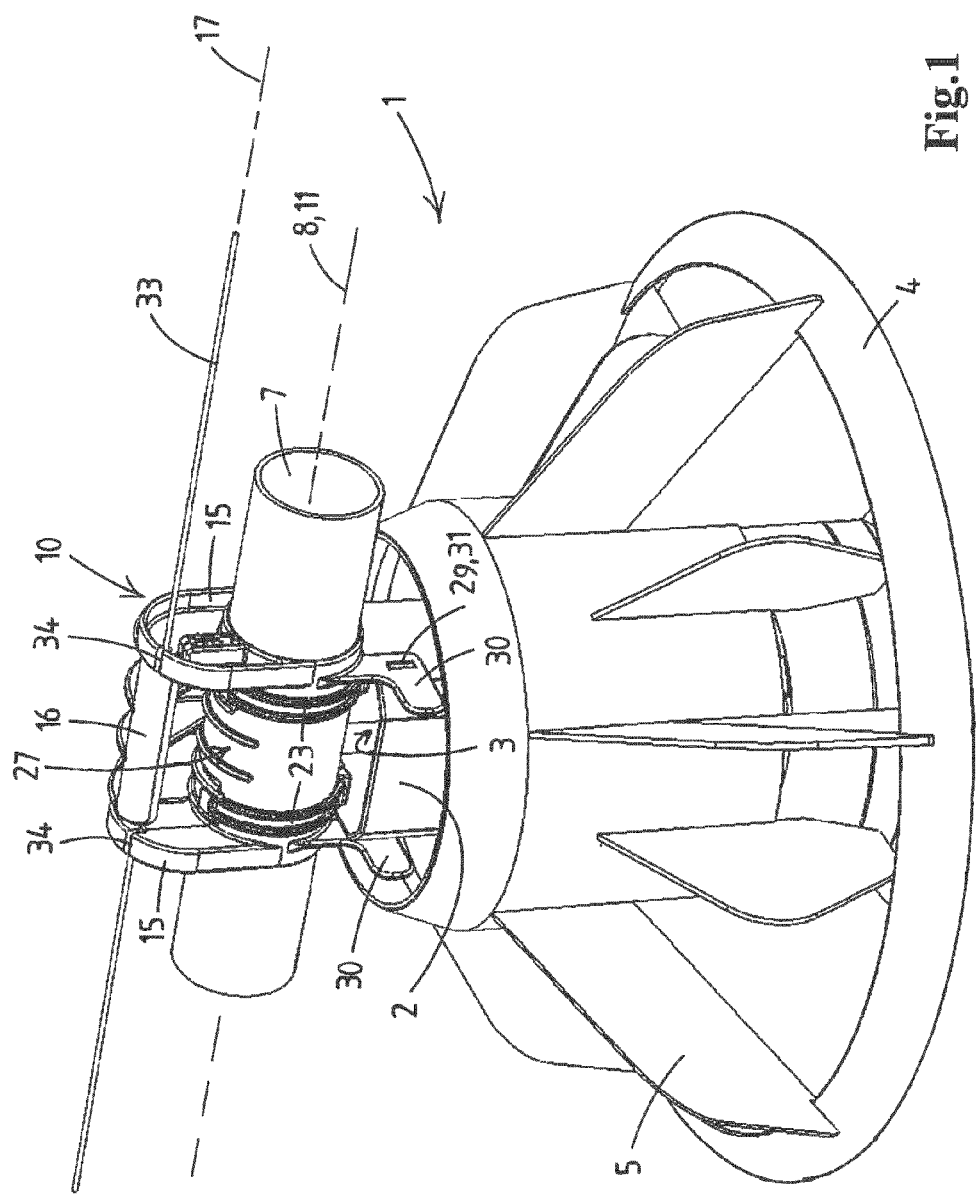
FIG. 1 shows a schematic perspective view of an embodiment of a conveyor pipe segment and feeding device hanging thereto in the feeding position.

In FIGS. 1-8 only one feeding device of a feed distribution system is shown. This feeding device in its entirety has been given the reference numeral 1. The device 1 comprises a drop tube 2 having an inlet 3 at an upper end thereof. At a lower end the drop tube 2 opens out above a dispensing pan 4 connected to this drop tube 2. The drop tube 2 is equipped with radially extending partitions 5 dividing the dispensing pan in distinctive feeding sections.

In FIGS. 1-8 only a small segment of a conveyor pipe 7 is shown. This segment of the pipe 7 is positioned with its longitudinal axis 8 substantially horizontal and leads to a feed storage (not shown), like a silo, filled with feed for poultry, like broilers. Suitable transportation means (not shown) are provided, like a rotatable screw or disc chain scraper extending inside the pipe 7, for transporting the feed out of the storage via the conveyor pipe 7 towards the feeding device 1.

Figure 3:
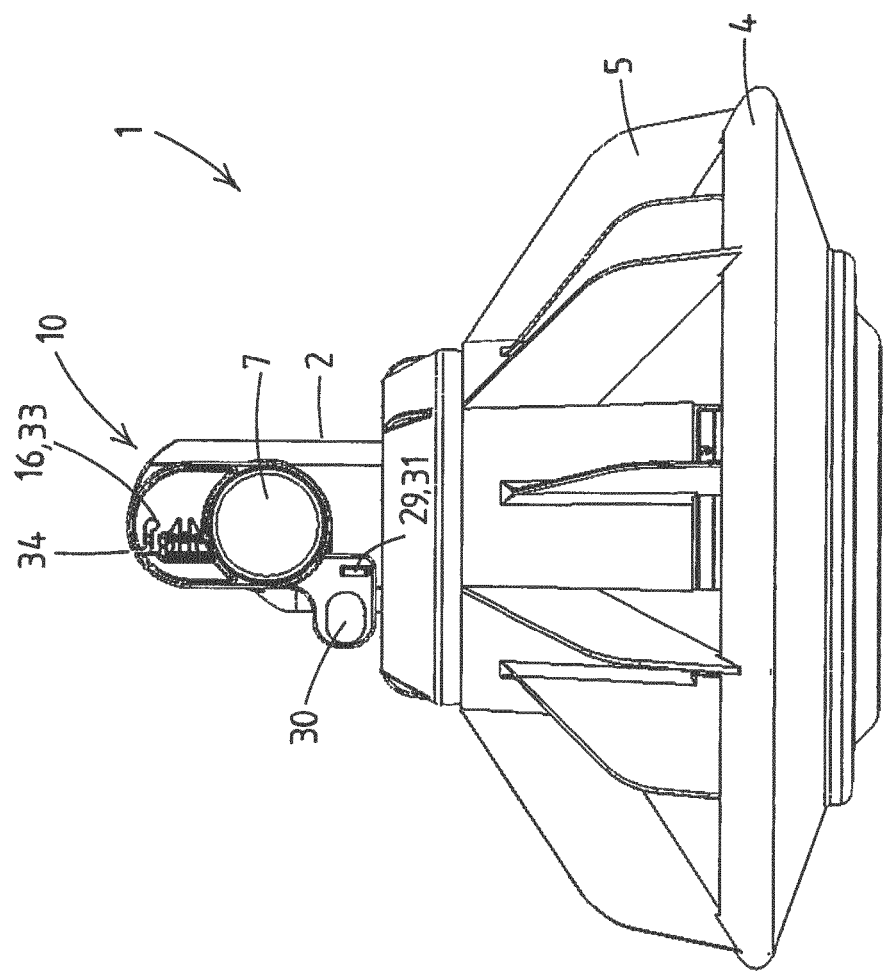
FIG. 3 shows the feeding position of FIG. 1 in a side view.

The segment of the pipe 7 is provided with a downwardly directed substantially rectangular outlet 9 (see FIG. 6) at a lower part of its circumference. The inlet 3 of the drop tube 2 is positioned straight underneath this outlet 9 in a feeding position of the device 1 as shown in FIGS. 1 and 3.

The feeding device 1 is attached to the pipe 7 by means of an attachment part 10. This attachment part 10 comprises two semi-circular halves 10a, 10b which together delimit a substantially cylindrical recess having a central axis 11. The halves 10a, 10b are clicked together around the pipe 7 at the location of the outlet 9 by means of a suitable snap connection 13. The attachment part 10 is able to rotate as a hinge around the pipe 7. With this the central axis 11 of the attachment part 10 is the same as the longitudinal axis 8 of the segment of the pipe 7.

The attachment part 10 further comprises two radially outward projecting ears 15. Between those ears 15 a hinge connection 16 is provided. The hinge connection 16 has a central axis 17 which extends at a distance h1 parallel to the axis 8, 11. Furthermore the hinge connection is positioned at a distance h2 above the outer circumference of the pipe 7.

Figure 4:
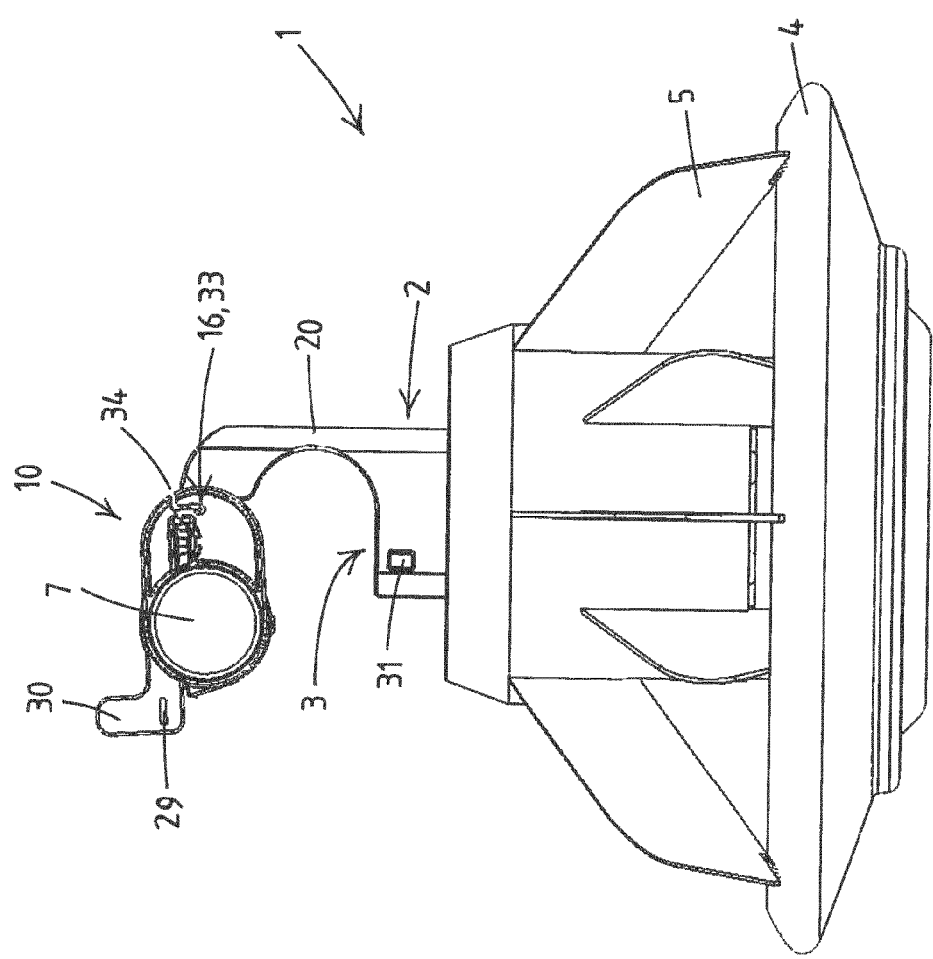
FIG. 4 shows an intermediate position in a side view.

The drop tube 2 at its upper side is provided with a recessed segment 20 (see FIG. 4). At its outer side this recessed segment 20 extends in between the ears 15 and is connected to the hinge connection 16. At its inner side this recessed segment 20 connects to the drop tube 2 at the position of its inlet 3. Between the hinge connection 16 and the inlet 3 a distance h3 is present.

Figure 5:
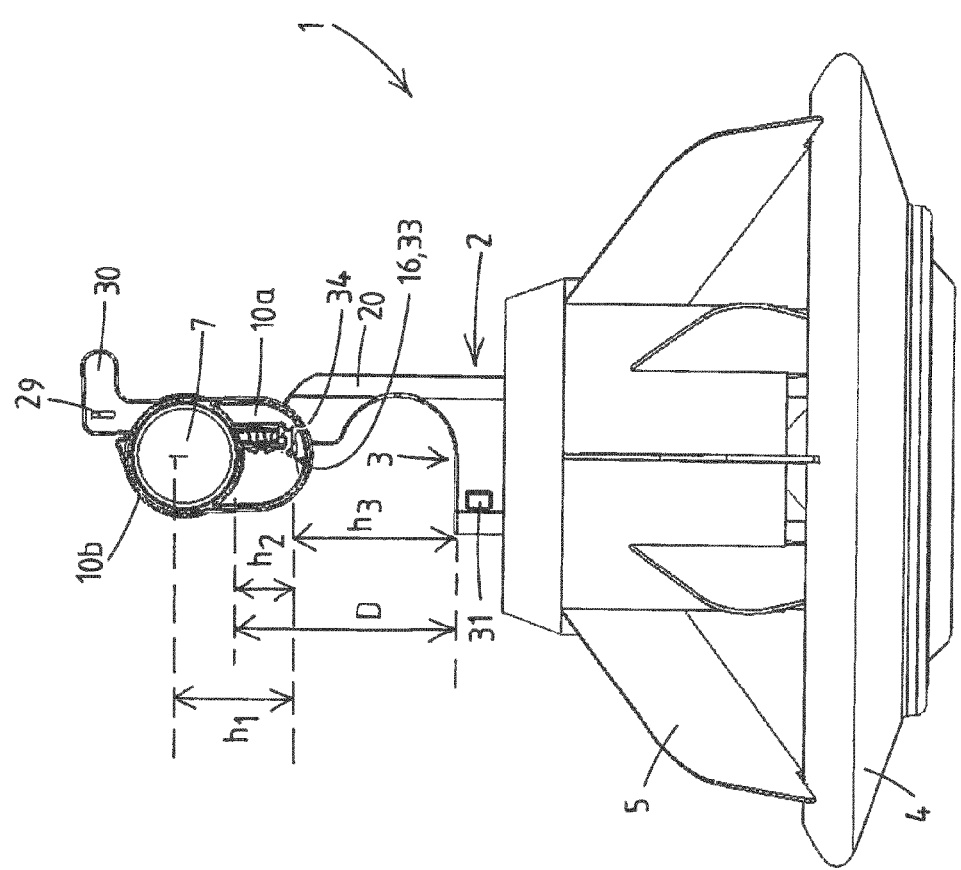
FIG. 5 shows the cleaning position of FIG. 3 in a side view.
Figure 6:
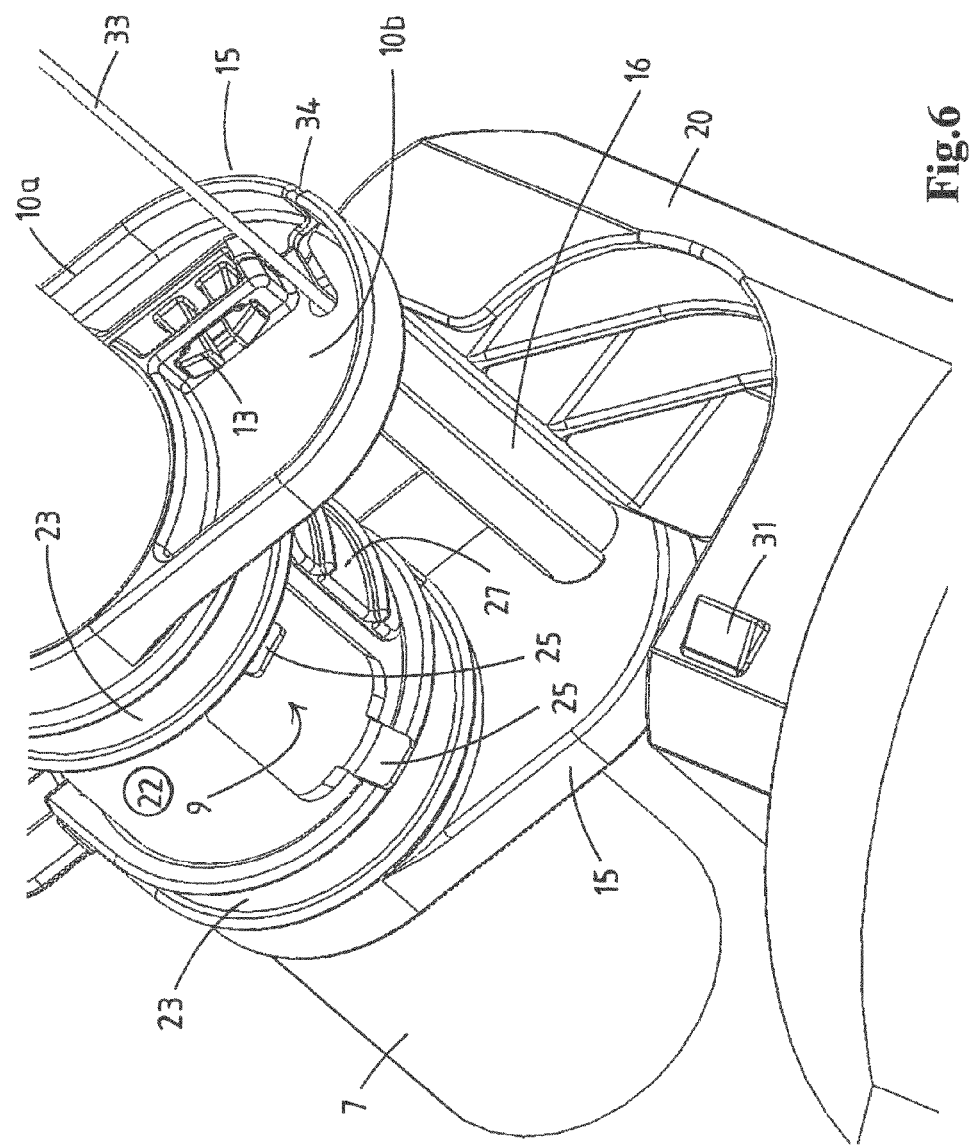
FIG. 6 shows an enlarged perspective view of the attachment part and drop tube in a first intermediate position.
Figure 7:
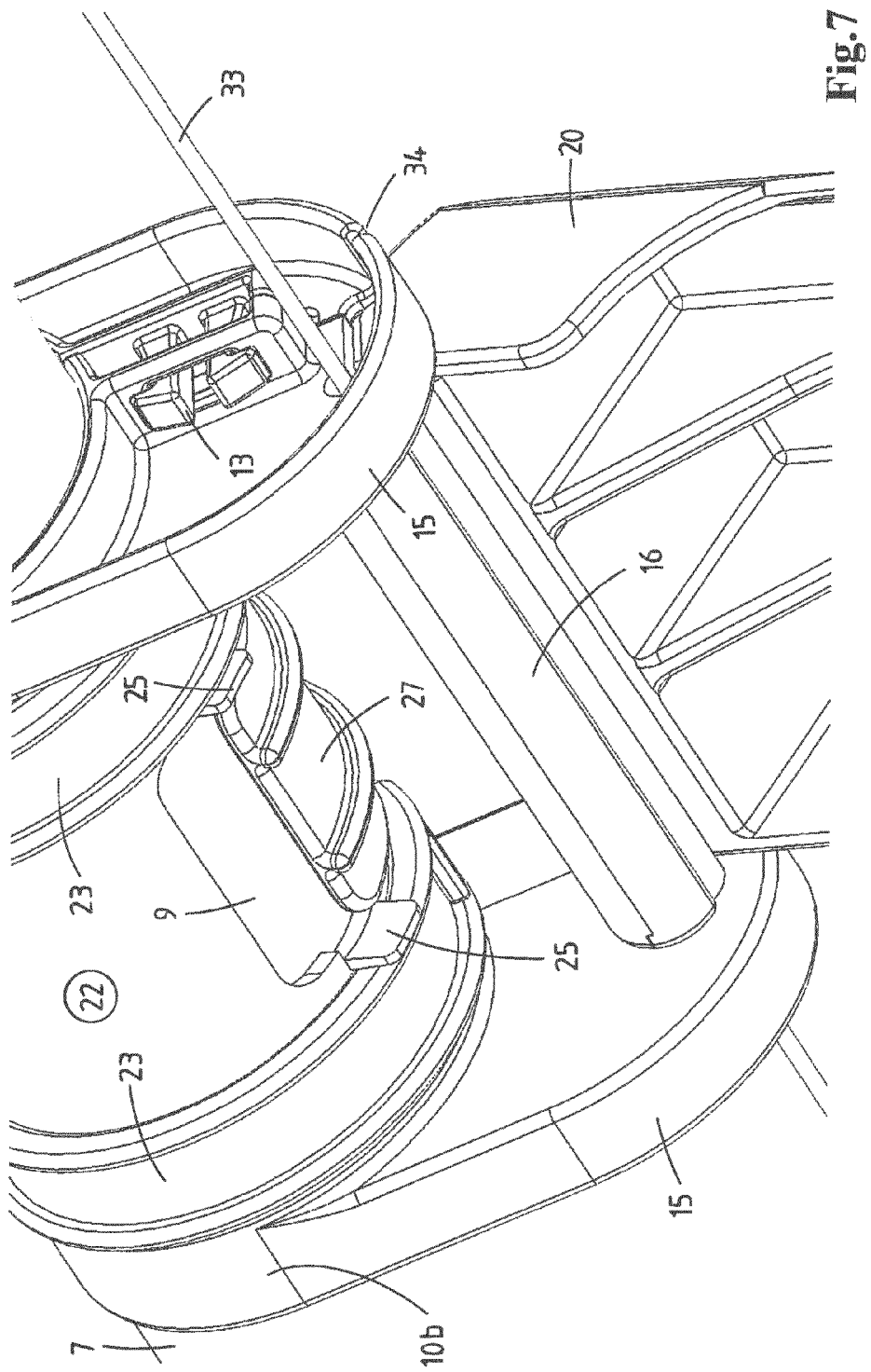
FIG. 7 shows an enlarged perspective view of the attachment part and drop tube in a second intermediate position.

As can be seen in FIG. 6, the attachment part 10 delimits a passage 22 in between two ring-shaped wall parts 23. During a rotation of the attachment part 10 around the pipe 7, those wall parts 23 slide along outwardly projecting lips 25 of the pipe 7 which delimit the outlet 9 sideways. The attachment part 10 further is provided with an integral valve 27. The valve 27 is formed by a curved plate which is sealingly slideable along an outer circumference of the conveyor pipe 7 during rotation of the attachment part 10. With this the valve 27 is dimensioned such that it fits sliding in between the two lips 25 and is able to fully cover/block the outlet 9 in a cleaning position of the device 1 as shown in FIGS. 2, 5 and 8.

The attachment part 10 is provided with first locking means 29 provided at arms 30 which in the position as shown in FIGS. 1 and 3 locks with complementary second locking means 31 provided on the drop tube 2.

A tensioned wire 33 is placed above the pipe 7. The attachment part 10 is hooked to the wire 33 via grooves 34 inside the ears 15. In the hooked position the wire 33 extends through the hinge connection 16.

Figure 2:
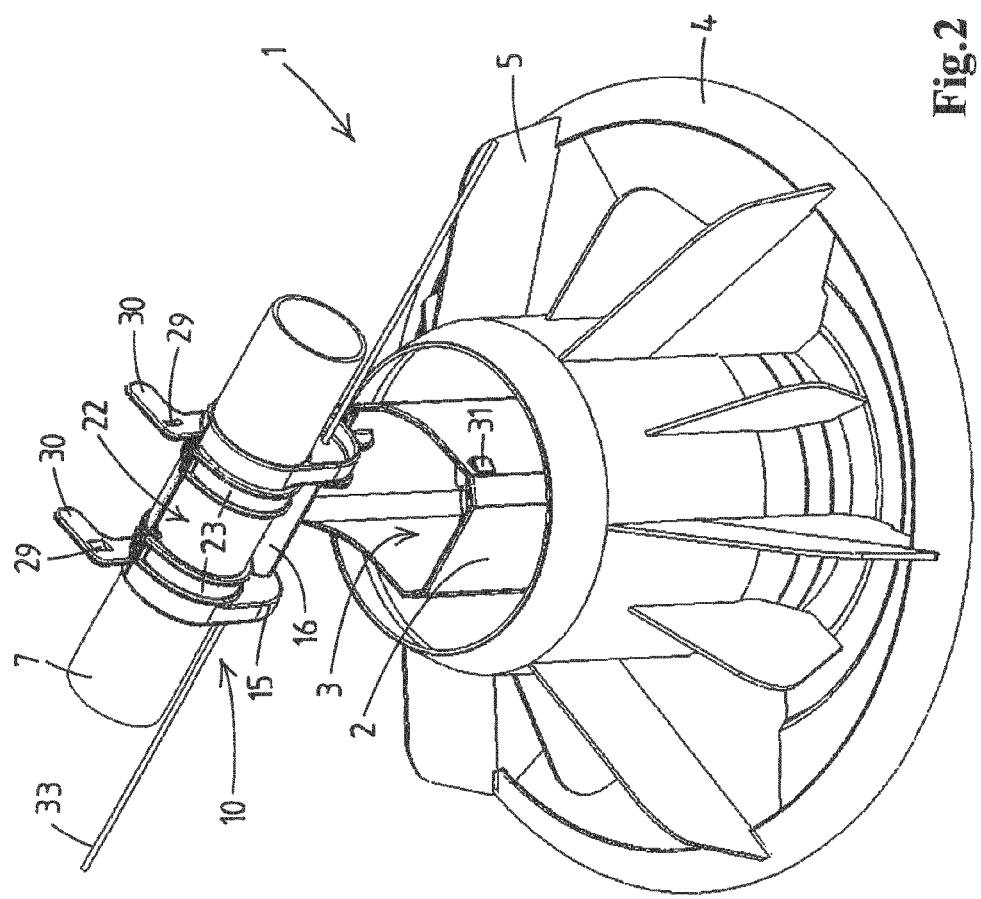
FIG. 2 shows a view according to FIG. 1 in the cleaning position.
Figure 8:
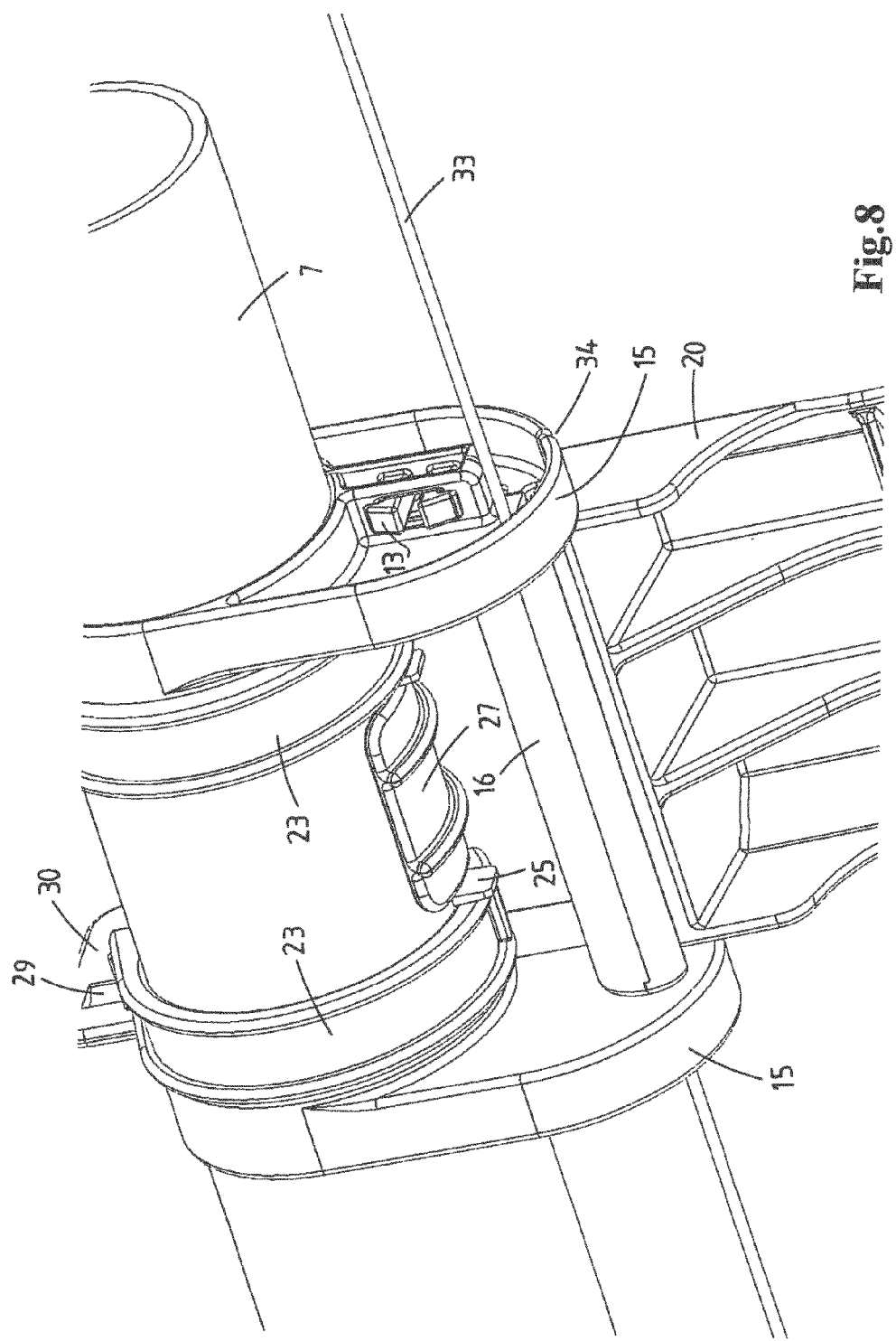
FIG. 8 shows an enlarged perspective view of the attachment part and drop tube in a cleaning position.

During use the feeding device 1 can now be easily moved from the feeding position as shown in FIGS. 1 and 3 into the cleaning position as shown in FIGS. 2, 5 and 8. This can be done by first releasing the tension of the wire 33 and then unlocking the locking means 29, 31 by pushing the arms 30 somewhat outward. Simultaneously the attachment part 10 can then be rotated around the pipe 7 in the clockwise direction in the view of FIGS. 3-5. With this the hinge connection 16 starts to move from an upper position towards a lower position, and with this movement takes along the drop tube 2 with it. In particular, the inlet 3 of the drop tube 2 then comes to lie at a distance D underneath the pipe 7. This distance D is substantially equal to h2+h3. At the same time the valve 27 gets to close off the outlet 9 entirely in this cleaning position. The sliding of the valve 27 from the feeding position towards the cleaning position can clearly be seen in the enlarged views of FIGS. 6-8.

In the cleaning position the feeding device 1 has the freedom to swing back and forth around the hinge connection 16, while at the same time, owing to the distance D, the inlet 3 has been made accessible from above. A farmer can now easily hose the entire feeding device 1 clean from above. In particular it is then possible for the farmer to hose clean the critical inner side of the drop tube 2 including its transition towards the pan 4 without having to bend over or the like. The inner and outer sides of the attachment part 10 and the outer side of the pipe 7 can then be hosed clean as well. Finally it is possible to flush clean the pipe 7 with water without having the water prematurely leaking out via the outlet 9.

As soon as the cleaning operation has ended, the farmer can swing the feeding device 1 backwards such that all the water can run out of the pan 4. Then the feeding device 1 can be brought back into its feeding position by means of a simple rotation of the attachment part 10 in the counter-clockwise direction in the view of FIGS. 3-5, until the locking means 29, 31 get locked to each other again. After that the wire 33 can be tensioned again and the system is ready for transporting feed out of the storage via the pipe 7 towards the feeding devices 1. Advantageously, during this counter-clockwise rotation, the outlet 9 is automatically brought back in flow communication with the inlet 3 again, because the passage 22 gets aligned with the outlet 9 while at the same time the inlet 3 gets positioned closely underneath the passage 22 and outlet 9 respectively.

Figure 9:
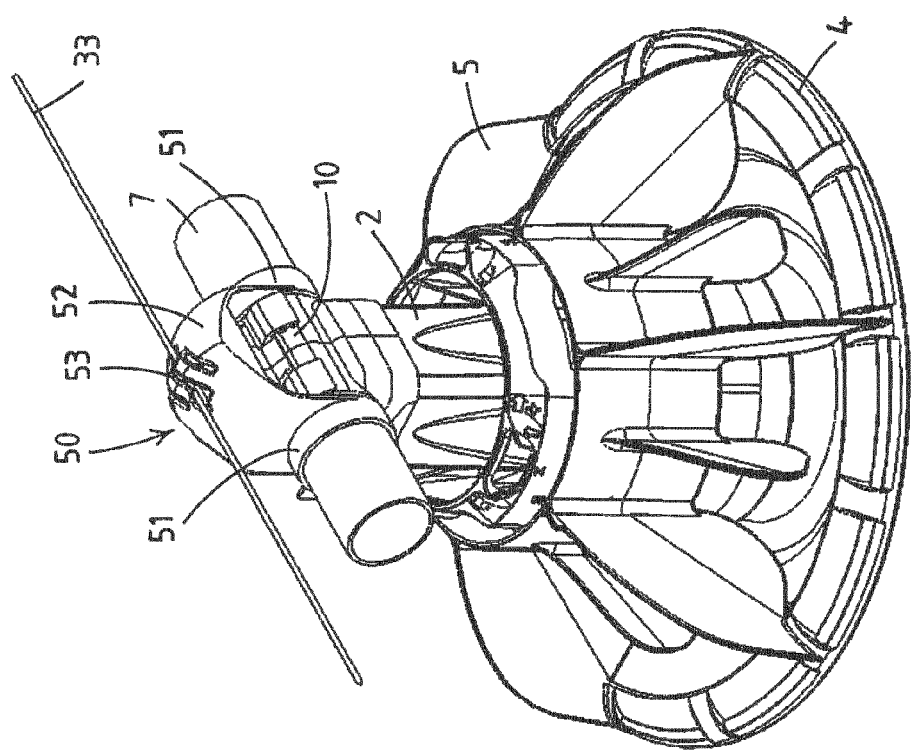
FIG. 9 is a view according to FIG. 1 of a variant with a top-piece.
Figure 10:
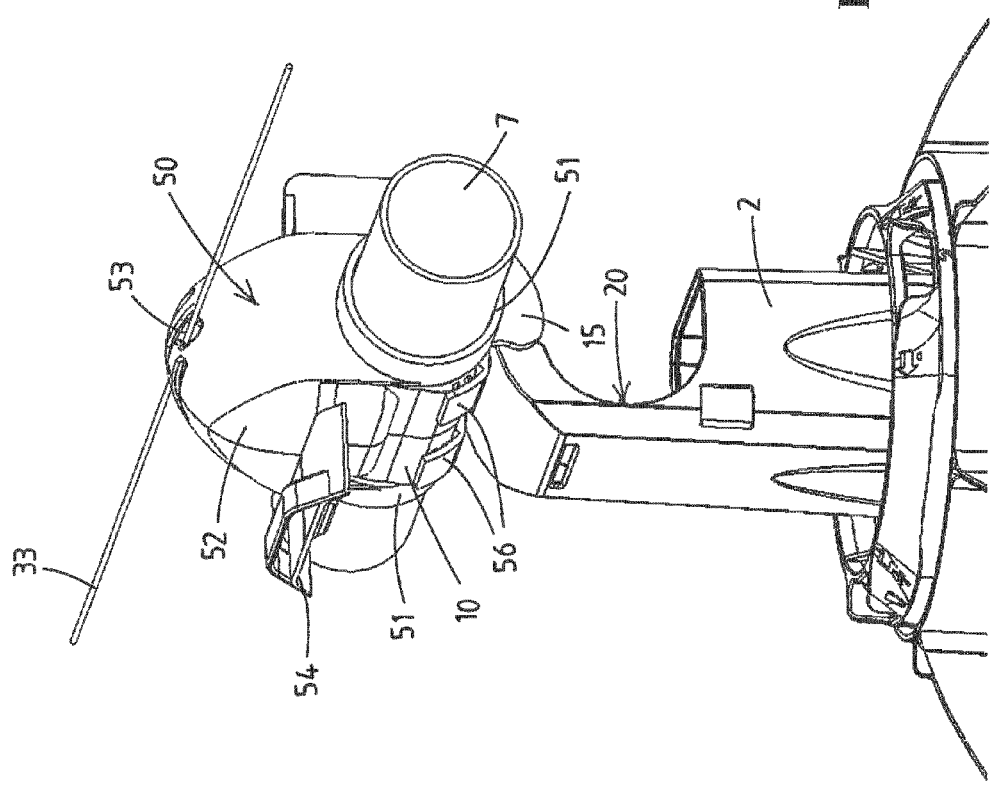
FIG. 10 is a partially enlarged view of FIG. 9 in the cleaning position.

In FIGS. 9 and 10 a variant is shown of which similar parts have been given the same reference numerals. In this variant a top-piece 50 is provided which fits around the pipe 7 by means of two mounting rings 51. Between the two rings 51 a bridging section 52 extends with a play over the attachment part 10. The bridging section 52 is provided with grooves 53 into which the wire 33 can be hooked. Between the top piece 50 and the attachment part 10 a locking lip 54 is provided which is movable between a locked and an unlocked position. In FIG. 10 the unlocked position is shown. The top-piece 50 extends with such a play over the attachment part 10 and fits to the pipe 7 sideways of the attachment part 10, that, in the unlocked position of the lip 54, the attachment part 10 is able to freely rotate from the feeding position (FIG. 9) towards the cleaning position (FIG. 10) and vice versa. During such rotation, the top-piece 50 and thus also the wire 33 are well able to remain in position without starting to co-rotate with the attachment part 10.

Figure 11:
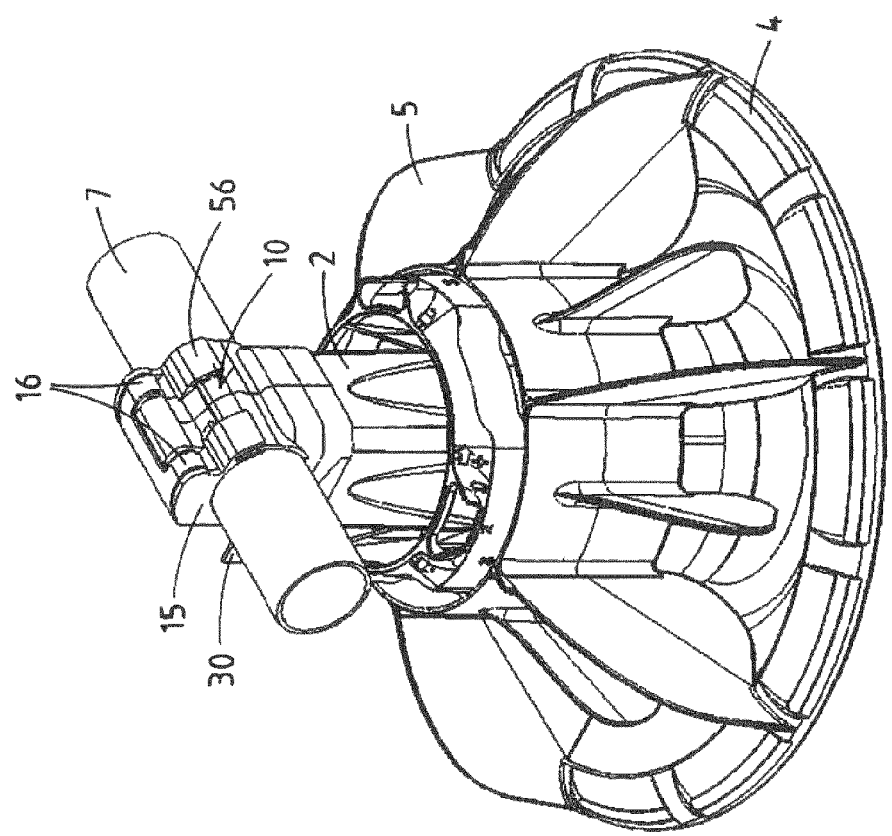
FIG. 11 is a view according to FIG. 10 without the top-piece.
Figure 12:
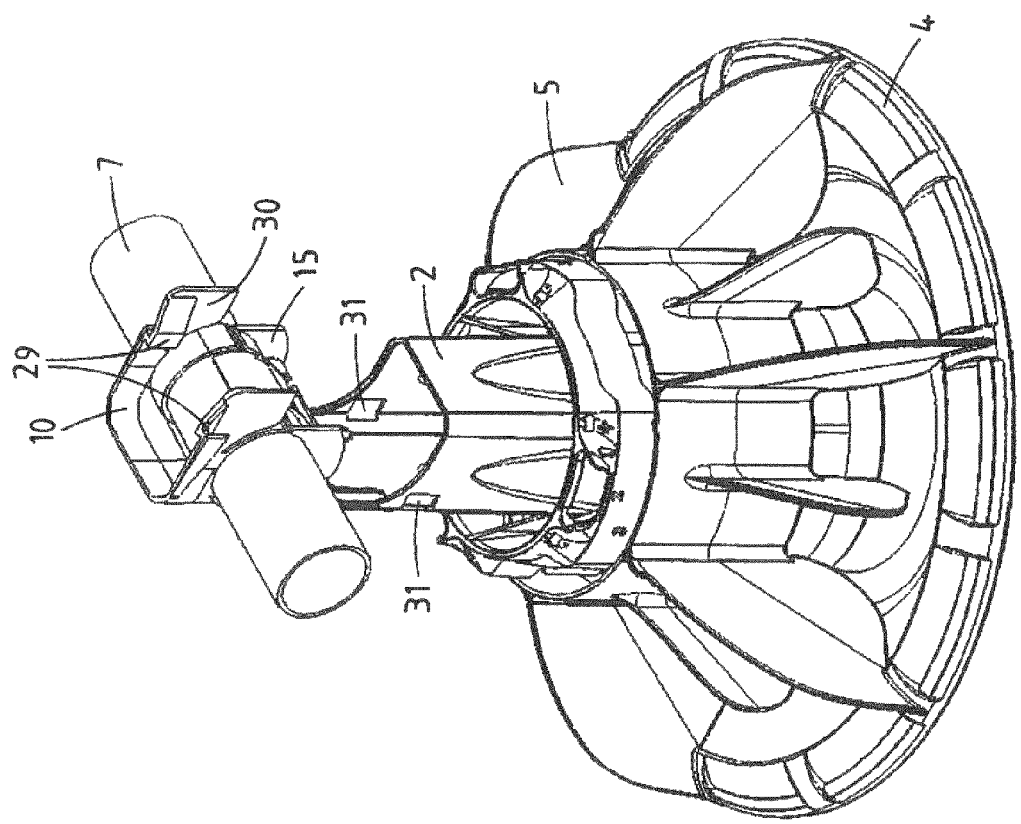
FIG. 12 is a view according to FIG. 11 in the cleaning position.

In FIGS. 11 and 12 the same variant is shown of the feeding device as in FIGS. 9 and 10, but this time without a top-piece being clamped to the pipe 7 and without a wire being tensioned above the pipe 7.

Figure 13:
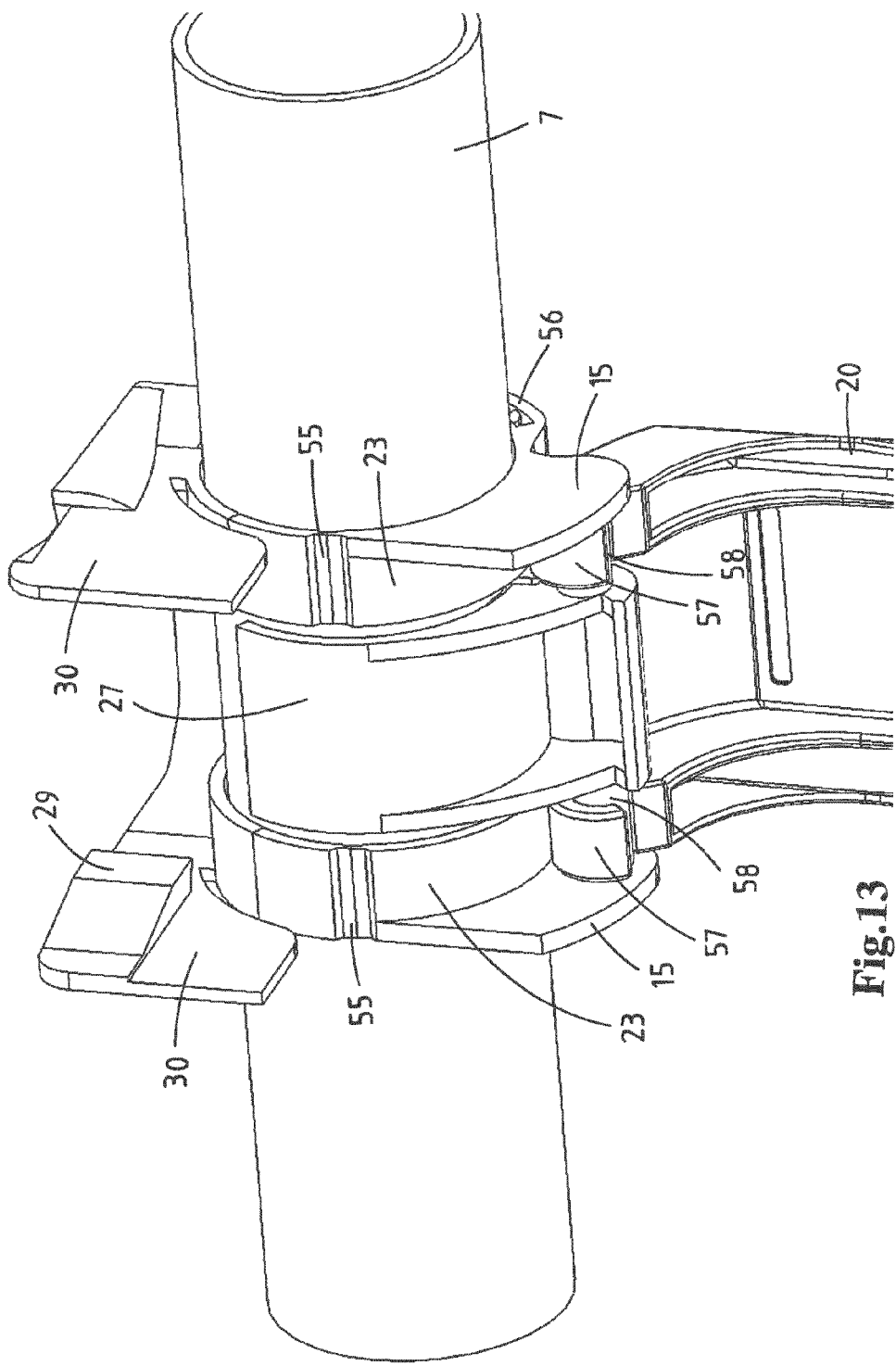
FIG. 13 is a partially enlarged view of FIG. 12.

In FIG. 13 it can be seen that the attachment part 10 here comprises two semi-circular halves 10a, 10b which at one end are hingedly connected to each other by means of a film hinge 55 while at another end they are clicked together around the pipe 7 at the location of the outlet 9 by means of a suitable releasable connection 56. Also it can be seen here that the attachment part 10 grips with two hinge hooks 57 around complementary hinge shafts 58 of the drop tube 2. Together the hooks 57 and shafts 58 form the hinge connection 16 (see also FIG. 11).

Besides the embodiments shown, numerous variants are possible. The device may be of another type like an "oval" type having an oval pan seen in top view, and the several parts of the device may be given any other desired shape or dimension. Preferably the various components of the feeding device are made out of plastic. Other suitable materials are also possible. Instead of the attachment part making a turn of 180 degrees between its feeding and cleaning positions, it is also possible to provide for a bigger or smaller rotation angle between those two positions like for example one of 90 or one of 270 degrees. Instead of the hinge connection with the drop tube inlet moving between an upper and a lower position relative to the pipe, it is also possible for them to move between other positions, like for example between a left and a right position. As long as the inlet in one of both positions gets distanced from the pipe and thus gets accessible from above, this is all possible. Instead of the valve being integrally formed together with the rotatable attachment part, it is also possible to provide for a separate valve element which can be operated independent of the attachment part. Thus it becomes possible to close of the outlet entirely or partly even in the feeding position. Instead of being formed by a circumferentially closed pipe, the conveyor line can also be formed by another type of elongated distribution means like one that is substantially open at its upper side, for example a trough.

Thus according to the invention a multifunctional feeding system is achieved which can be thoroughly cleaned periodically in a simple and cost-effective manner. The system is friendly to the animals and beneficial for the farmer.

The invention claimed is:

1. A feed distribution system for feeding poultry, comprising:
   a feed storage;
   at least one conveyor line with a number of mutually spaced outlets;
   a number of feeding devices each having a dish-shaped dispensing pan and a feed drop tube opening out above a central part of the pan; and
   transportation means for transporting feed out of the storage via the conveyor line towards the respective feeding devices;
   wherein each feeding device is attached to the conveyor line with an inlet of the drop tube positioned below one of the outlets;
   wherein each feeding device has an attachment part that is rotatable around a longitudinal axis of the conveyor line;
   wherein the attachment part is separate from the drop tube, with the drop tube being hingedly connected by a hinge connection to the attachment part; and
   wherein the attachment part together with the hinge connection to the drop tube is rotatable around the conveyor line between a feeding and a cleaning position, with the inlet of the drop tube getting distanced from the outlet of the conveyor line when the attachment part together with the hinge connection to the drop tube is rotated from the feeding position to the cleaning position.

2. The feed distribution system according to claim 1, wherein the attachment part comprises a passage which is rotatable in front of the outlet of the conveyor line in the feeding position, and the attachment part comprises a valve element which is rotatable in front of the outlet of the conveyor line in the cleaning position.

3. The feed distribution system according to claim 2, wherein the valve element comprises a curved plate which is sealingly slideable along an outer circumference of the conveyor line.

4. The feed distribution system according to claim 1, wherein the hinge connection in the feeding position takes in an upper position relative to the conveyor line, and in the cleaning position takes in a lower position relative to the conveyor line.

5. The feed distribution system according to claim 1, wherein releasable first locking means are provided between the drop tube and the attachment part for releasably locking them together in the feeding position.

6. The feed distribution system according to claim 1, wherein the drop tube at its upper side is provided with a recessed segment for gripping around the conveyor line and attachment part respectively in the feeding position, the hinge connection being provided at an upper part of the recessed segment.

7. The feed distribution system according to claim 1, wherein the attachment part comprises two halves each delimiting substantially a semi-circular cross-sectional segment of the conveyor line.

8. The feed distribution system according to claim 7, wherein the two halves are hingedly connected to each other.

9. The feed distribution system according to claim 8, wherein the two halves are hingedly connected to each other by a film hinge.

10. The feed distribution system according to claim 1, wherein in a longitudinal direction of the conveyor line at opposing sides of the outlet, the conveyor line is provided with outwardly projecting lips along which circumferential wall parts of the attachment part are guided.

11. The feed distribution system according to claim 1, wherein a wire is tensionable above the conveyor line, the attachment part being hooked to the wire.

12. The feed distribution system according to claim 11, wherein the wire substantially extends through the hinge connection between the drop tube and the attachment part.

13. The feed distribution system according to claim 1, wherein a top-piece is connected to the conveyor line for having a wire connected thereto, which wire is tensionable above the conveyor line.

14. The feed distribution system according to claim 13, wherein the attachment part is rotatable relative to the top-piece in an unlocked position of second locking means between the top piece and the attachment part.

15. A feeding device for poultry for use in a feed distribution system, comprising:
    a dish-shaped dispensing pan;
    a feed drop tube opening out above a central part of the pan; and
    a rotatable attachment part;
    wherein the rotatable attachment part is separate from the drop tube, with the drop tube being hingedly connected by means of a hinge connection to the rotatable attachment part; and
    wherein the rotatable attachment part and the drop tube can be hinged open around the hinge connection from a feeding position into a cleaning position, with the inlet of the drop tube getting distanced from the attachment part in the cleaning position.

16. The feeding device according to claim 15, wherein the attachment part comprises a passage rotatable in the feeding position, and the attachment part comprises a valve element rotatable in the cleaning position.

17. A method for performing a cleaning operation to one or more feeding devices of a feed distribution system for poultry according to claim 1, comprising the steps of:
    rotating the attachment part of the feeding device around the conveyor line from the feeding position towards the cleaning position such that the inlet of the drop tube gets distanced from the attachment part and outlet of the conveyor line respectively;
    hosing the feeding device that has the dish-shaped dispensing pan and the feed drop tube clean; and
    rotating the attachment part of the feeding device around the conveyor line from the cleaning position back into the feeding position such that the inlet of the drop tube gets to lie near the attachment part and outlet of the conveyor line respectively.

18. The method according to claim 17, wherein during the step of rotating the attachment part of the feeding device towards the cleaning position, a valve element gets positioned in front of the outlet of the conveyor line.

* * * * *